US008884968B2

(12) United States Patent
Markovic et al.

(10) Patent No.: US 8,884,968 B2
(45) Date of Patent: Nov. 11, 2014

(54) MODELING AN OBJECT FROM IMAGE DATA

(75) Inventors: Relja Markovic, Seattle, WA (US); Stephen Latta, Seattle, WA (US); Kevin Geisner, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 681 days.

(21) Appl. No.: 12/969,427

(22) Filed: Dec. 15, 2010

(65) Prior Publication Data

US 2012/0154618 A1 Jun. 21, 2012

(51) Int. Cl.
*G06T 13/00* (2011.01)
*G06K 9/00* (2006.01)
*H04N 5/235* (2006.01)
*G06T 15/20* (2011.01)

(52) U.S. Cl.
CPC ................................... *G06T 15/205* (2013.01)
USPC .......................... 345/473; 382/103; 348/221.1

(58) Field of Classification Search
CPC ....... G06T 17/00; G06T 7/0089; G06T 13/40; G06T 2207/20124; G06T 7/0032; G06T 7/0051; G06T 13/20; G06T 17/20; G06K 9/6209; G06K 2209/05; G06K 9/00362; G06K 9/6204; Y10S 345/949; Y10S 345/953; Y10S 345/955; Y10S 707/99936
See application file for complete search history.

(56) References Cited

U.S. PATENT DOCUMENTS

| 4,627,620 | A | 12/1986 | Yang |
| 4,630,910 | A | 12/1986 | Ross et al. |
| 4,645,458 | A | 2/1987 | Williams |
| 4,695,953 | A | 9/1987 | Blair et al. |
| 4,702,475 | A | 10/1987 | Elstein et al. |
| 4,711,543 | A | 12/1987 | Blair et al. |
| 4,751,642 | A | 6/1988 | Silva et al. |
| 4,796,997 | A | 1/1989 | Svetkoff et al. |
| 4,809,065 | A | 2/1989 | Harris et al. |
| 4,817,950 | A | 4/1989 | Goo |
| 4,843,568 | A | 6/1989 | Krueger et al. |

(Continued)

FOREIGN PATENT DOCUMENTS

| CN | 201254344 B | 6/2010 |
| EP | 0583061 A2 | 2/1994 |

(Continued)

OTHER PUBLICATIONS

Srinivasan, et al., "Intelligent human body tracking, modeling, and activity analysis of video surveillance system: A survey", Retrieved at << http://collegejayam.ac.in/ja/11.pdf>>, Journal of Convergence in Engineering, Technology and Science, vol. 1, Dec. 2009, pp. 1-8.

(Continued)

*Primary Examiner* — Kee M Tung
*Assistant Examiner* — Haixia Du
(74) *Attorney, Agent, or Firm* — Gregg Wisdom; Micky Minhas

(57) ABSTRACT

A method for modeling an object from image data comprises identifying in an image from the video a set of reference points on the object, and, for each reference point identified, observing a displacement of that reference point in response to a motion of the object. The method further comprises grouping together those reference points for which a common translational or rotational motion of the object results in the observed displacement, and fitting the grouped-together reference points to a shape.

20 Claims, 4 Drawing Sheets

(56) References Cited

U.S. PATENT DOCUMENTS

| | | |
|---|---|---|
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,930,379 A * | 7/1999 | Rehg et al. ................ 382/107 |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,931,145 B1 * | 8/2005 | Kroos et al. ................ 382/107 |
| 6,937,742 B2 | 8/2005 | Roberts et al. |
| 6,950,534 B2 | 9/2005 | Cohen et al. |
| 7,003,134 B1 * | 2/2006 | Covell et al. ................ 382/103 |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,257,237 B1 | 8/2007 | Luck et al. |
| 7,259,747 B2 | 8/2007 | Bell |
| 7,308,112 B2 | 12/2007 | Fujimura et al. |
| 7,317,836 B2 | 1/2008 | Fujimura et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,567,251 B2 * | 7/2009 | Sasaki ........................ 345/473 |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |
| 7,701,439 B2 | 4/2010 | Hillis et al. |
| 7,702,130 B2 | 4/2010 | Im et al. |
| 7,704,135 B2 | 4/2010 | Harrison, Jr. |
| 7,710,391 B2 | 5/2010 | Bell et al. |

(56) References Cited

U.S. PATENT DOCUMENTS

| | | | |
|---|---|---|---|
| 7,729,530 | B2 | 6/2010 | Antonov et al. |
| 7,746,345 | B2 | 6/2010 | Hunter |
| 7,760,182 | B2 | 7/2010 | Ahmad et al. |
| 7,764,828 | B2 * | 7/2010 | Sasaki et al. ............... 382/154 |
| 7,809,167 | B2 | 10/2010 | Bell |
| 7,834,846 | B1 | 11/2010 | Bell |
| 7,852,262 | B2 | 12/2010 | Namineni et al. |
| 7,860,273 | B2 * | 12/2010 | Kochi et al. ............... 382/103 |
| RE42,256 | E | 3/2011 | Edwards |
| 7,898,522 | B2 | 3/2011 | Hildreth et al. |
| 8,035,612 | B2 | 10/2011 | Bell et al. |
| 8,035,614 | B2 | 10/2011 | Bell et al. |
| 8,035,624 | B2 | 10/2011 | Bell et al. |
| 8,072,470 | B2 | 12/2011 | Marks |
| 2003/0085887 | A1 | 5/2003 | Hunt et al. |
| 2008/0026838 | A1 | 1/2008 | Dunstan et al. |
| 2008/0095402 | A1 | 4/2008 | Kochi et al. |
| 2010/0197392 | A1 | 8/2010 | Geiss |
| 2010/0302247 | A1 | 12/2010 | Perez et al. |

FOREIGN PATENT DOCUMENTS

| | | | |
|---|---|---|---|
| JP | 08044490 | A1 | 2/1996 |
| WO | 93/10708 | A1 | 6/1993 |
| WO | 97/17598 | A1 | 5/1997 |
| WO | 99/44698 | A1 | 9/1999 |

OTHER PUBLICATIONS

Moon, et al., "Tracking of Human Activities using Shape-Encoded Particle Propagation", Retrieved at http://ieeexplore.ieee.org/stamp/stamp.jsp?arnumber=00959027 >>, 2001, pp. 357-360.

Fares, et al., "Collision Detection for Virtual Reality Using Ellipsoidal Fitting", Retrieved at << http://www.ida.liu.se/~kajny/papers/f39.pdf >>,Sep. 30, 2010, pp. 6.

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Non-rigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collusion of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

State Intellectual Property Office of China, Office Action of Chinese Patent Application No. 201110443186.4, Dec. 2, 2013, 13 pages.

* cited by examiner

MODELING AN OBJECT FROM IMAGE DATA

BACKGROUND

Image data derived from video is an attractive form of input for computer applications. Advances in low-cost digital imaging have extended the feasibility of this approach to consumer-electronics systems, including video games. Nevertheless, extracting usable input from image data is a complex task. In some cases, the image data may be used to construct a virtual model of one or more physical objects, whose movements or configurations encode the input. However, images of such objects may include optical artifacts, may obscure key features, or, for other reasons, may fail to manifest the input in a straightforward manner.

SUMMARY

One embodiment of this disclosure provides a method for modeling an object from image data, such as an image derived from video. The method comprises identifying in an image a set of reference points on the object, and, for each reference point identified, observing a displacement of that reference point in response to a motion of the object. The method further comprises grouping together those reference points for which a common translational or rotational motion of the object results in the observed displacement, and fitting the grouped-together reference points to a shape.

The summary above is provided to introduce a selected part of this disclosure in simplified form, not to identify key or essential features. The claimed subject matter, defined by the claims, is limited neither to the content of this summary nor to implementations that address problems or disadvantages noted herein.

DETAILED DESCRIPTION

Figure 2:
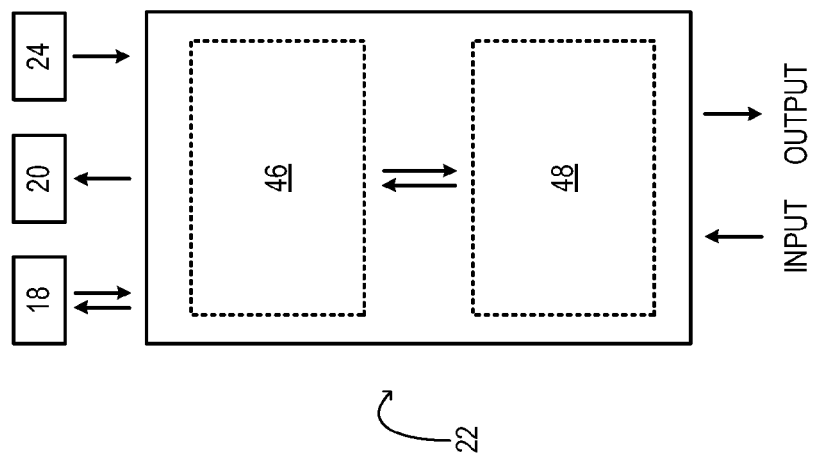
FIG. 2 schematically shows an example controller in accordance with an embodiment of this disclosure.

Aspects of this disclosure will now be described by example and with reference to the illustrated embodiments listed above. Components, process steps, and other elements that may be substantially the same in one or more embodiments are identified coordinately and are described with minimal repetition. It will be noted, however, that elements identified coordinately may also differ to some degree. It will be further noted that the drawing figures included in this disclosure are schematic and generally not drawn to scale. Rather, the various drawing scales, aspect ratios, and numbers of components shown in the figures may be purposely distorted to make certain features or relationships easier to see.

Figure 1:
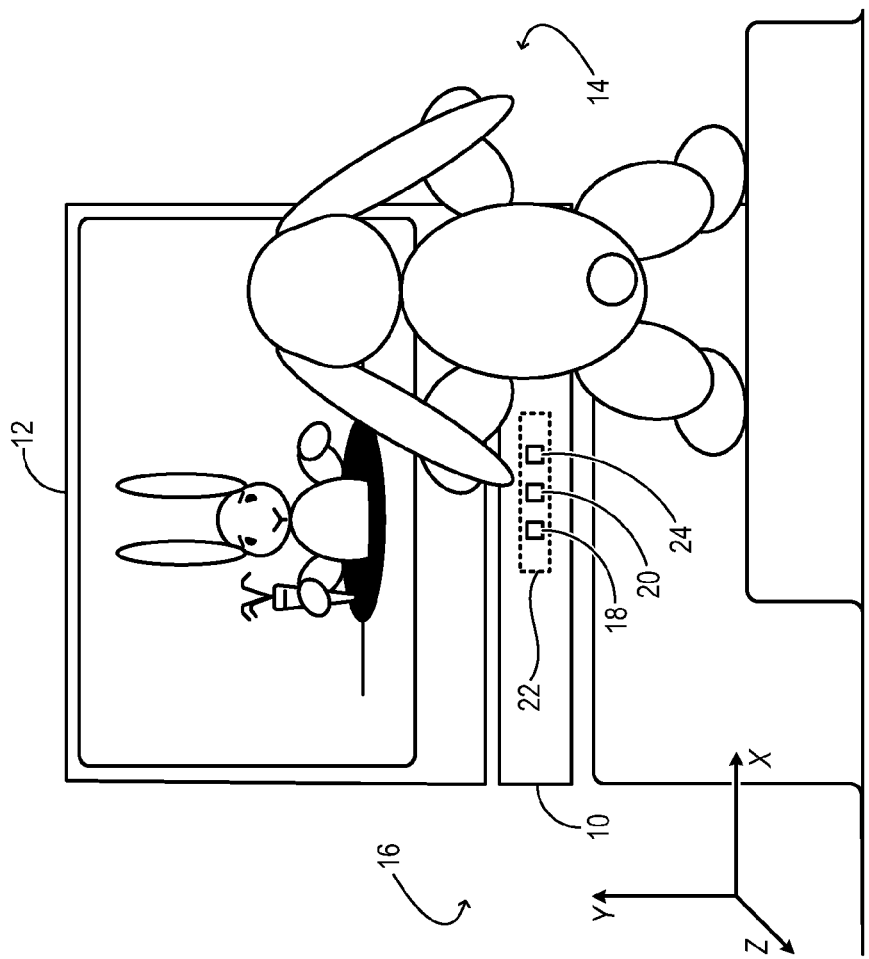
FIG. 1 schematically shows an example environment for modeling an object from image data in accordance with an embodiment of this disclosure.

FIG. 1 shows an example environment in which a virtual model of an object may be constructed based on video of the object in motion. Here and in subsequent drawings, object modeling is illustrated in the context of video gaming. However, other quite different applications are contemplated as well, and are equally embraced by this disclosure. Such applications include sign-language recognition, early-childhood education, autonomous customer service, and autonomous clinical examination, as examples.

FIG. 1 shows vision system 10, display 12, and object 14. The object may be virtually any moving or movable physical object arranged so it can be imaged by the vision system. Accordingly, the vision system and the object may be separated by any distance suitable to allow imaging.

In some embodiments, object 14 may be autonomously motile. It may be a living creature or autonomous mechanical device, for example. In one embodiment, the object may be a human being—e.g., a user of a video-game system, customer-service kiosk, or other computer system. In other embodiments, the object may be readily movable, but not autonomously motile. For example, the object may be an empty hand of a human being; the hand may be used to form a sequence of decipherable gestures—e.g., sign language. In another embodiment, the object may be a hand holding a stylus, a paintbrush, a paddle, a baton, or some other object. In FIG. 1, however, object 14 is a prop—specifically, one made in the shape of a bunny, which a user can manipulate to furnish input to a video game. In this and other examples, one aspect of the video game may be to animate the object, as shown in the drawing.

In the illustrated embodiment, vision system 10 is a component of video-game system 16. The vision system is configured to detect the positions, configurations, movements, and/or gestures of one or more objects and to furnish the same as input to a video-game application. The video-game system may be further configured to direct video output to display 12. The video output directed to the display may be derived from a virtual model of the object constructed by the vision system.

Continuing in FIG. 1, vision system 10 includes video camera 18, illumination source 20, and controller 22. In the illustrated embodiment, the video camera and the illumination source are coupled at the front face of the vision system, opposite object 14.

Video camera 18 is configured inter olio to acquire a sequence of two-dimensional (2D) plane images of object 14, or of a scene that includes the object. The video camera may include a lens that focuses light from the scene onto an ensemble of photosensitive elements—photodiode or charge-coupled device (CCD) elements, for example. Accordingly, the images formed by the video camera may comprise rectangular arrays of pixels. Each pixel may encode one or more of a brightness and a polarization state of the light reaching the camera from a particular locus of the object or scene. With appropriate pixel-wise filtering of the photosensitive elements, the video camera may be configured to form a color image of the object. Controller 22 may be configured to control image acquisition by the video camera, to receive the acquired images, and in some embodiments, to coordinate image acquisition with the release of light from illumination source 20.

In some embodiments, vision system 10 may be configured to detect and furnish the positions, configurations, movements, and/or gestures of object 14 in three dimensions (3D). Accordingly, video camera 18 and illumination source 20 may be configured for depth mapping. Depth mapping associates and encodes a depth coordinate Z with a corresponding pixel (X, Y) in a plane image. In one embodiment, a distinct Z coordinate may be stored for each (X, Y) pixel of the image. In other embodiments, the depth mapping may be of lower resolution than the plane image, and the Z coordinate may be determined for each pixel by interpolation.

In one embodiment, vision system 10 may enact depth mapping based on stereoscopic imaging of the object. Thus, the video camera may include multiple lenses and ensembles of photosensitive elements; controller 22 may be configured to trigonometrically derive a depth map based on the stereoscopic images formed by the video camera. In another embodiment, illumination source 20 may be configured to project structured or patterned light in a desired wavelength range (e.g., infrared or near-infrared light) onto the object. The video camera may be configured to produce an image in which a reflection of the patterned light is discernible, and the controller may be configured to determine the depth coordinate by triangulation. In another embodiment, the illumination source may be configured to emit a sequence of narrow pukes in the desired wavelength range. The controller may be configured to synchronize the opening and closure of an electronic shutter of the video camera to the pulsed output of the illumination source, and with further processing, enact a time-of-flight (TOF) depth-mapping approach. In still other embodiments, the vision system may use a combination of these and/or other strategies to furnish 3D image data suitable for the methods here disclosed.

Continuing in FIG. 1, vision system 10 includes microphone 24 also coupled at the front face, opposite object 14. The microphone is configured to transduce sound that may originate from the object, and to furnish the transduced sound as an input signal to controller 22. Such sound may come naturally from the object, or it may result from a movement—e.g., a deformation or collision—of the object.

FIG. 2 schematically shows example operative coupling among controller 22 and the various input and output components described above. The drawing also shows example functional components of the controller, which are described hereinafter. Controller 22 may be configured to enact any of the various functions and operations noted herein, and other functions as well. For example, the controller may be configured to execute a video-game or other software application, in which one or more positions, configurations, movements, and/or gestures of an object are furnished as input.

The configurations described above enable various methods for constructing a virtual model of an object. Accordingly, some such methods are now described, by way of example, with continued reference to the above configurations. It will be understood, however, that the methods here described, and others fully within the scope of this disclosure, may be enabled by other configurations as well. Naturally, each execution of a method may change the entry conditions for a subsequent execution and thereby invoke complex decision-making logic. Such logic is fully contemplated in this disclosure. Further, some of the process steps described and/or illustrated herein may, in some embodiments, be omitted without departing from the scope of this disclosure. Likewise, the illustrated sequence of the process steps may not always be required to achieve the intended results, but is provided for ease of illustration and description. One or more of the indicated actions, functions, or operations may be performed repeatedly, depending on the particular strategy being used.

Figure 3:
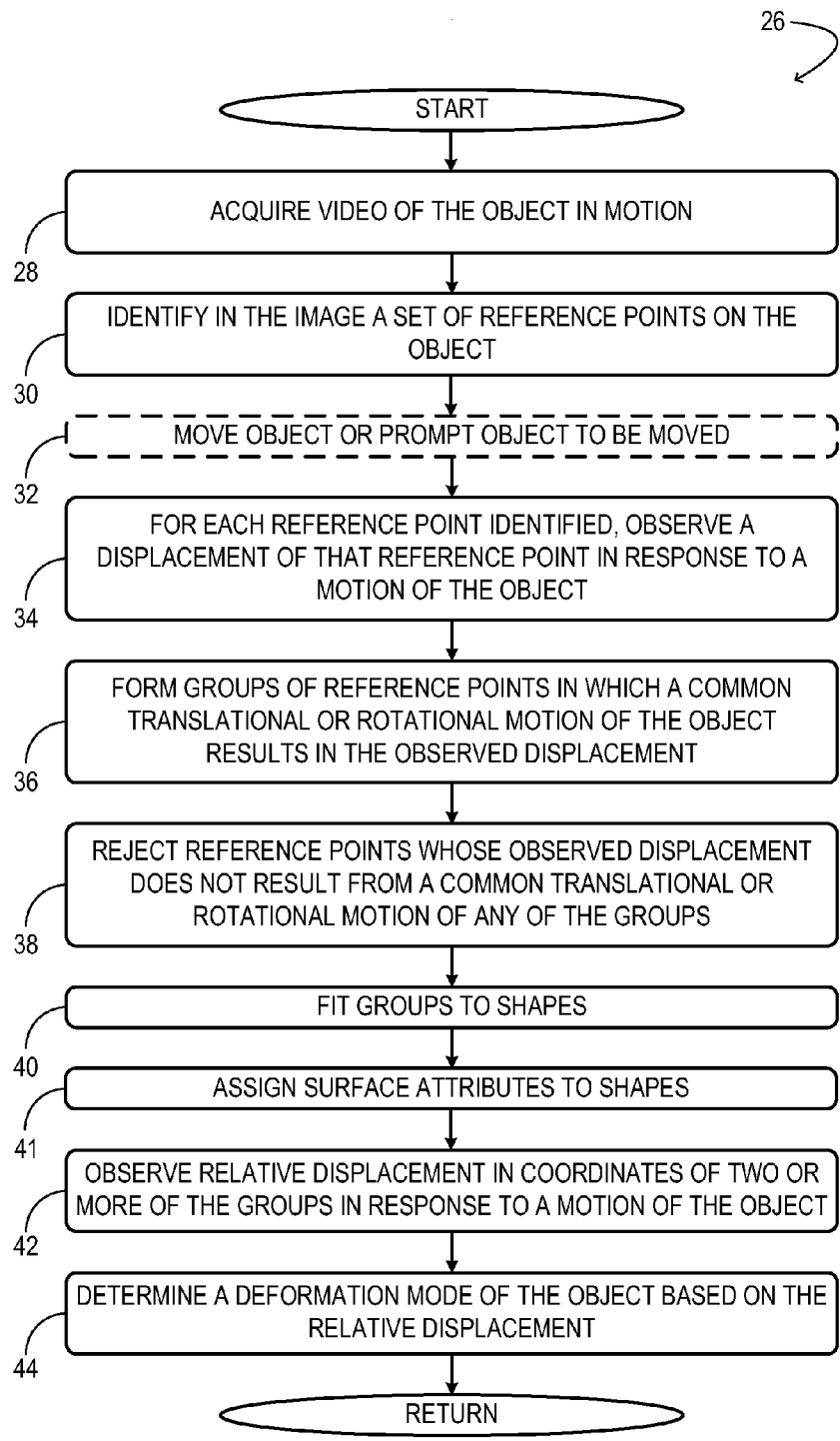
FIG. 3 illustrates an example method for modeling an object from image data in accordance with an embodiment of this disclosure.

FIG. 3 illustrates an example method 26 for constructing a virtual model of an object. At 28 video of the object begins or continues to be acquired. Captured by a video camera coupled in a vision system, the video includes a sequence of images of the object at a frame rate high enough to capture the expected motion of the object.

Figure 4:
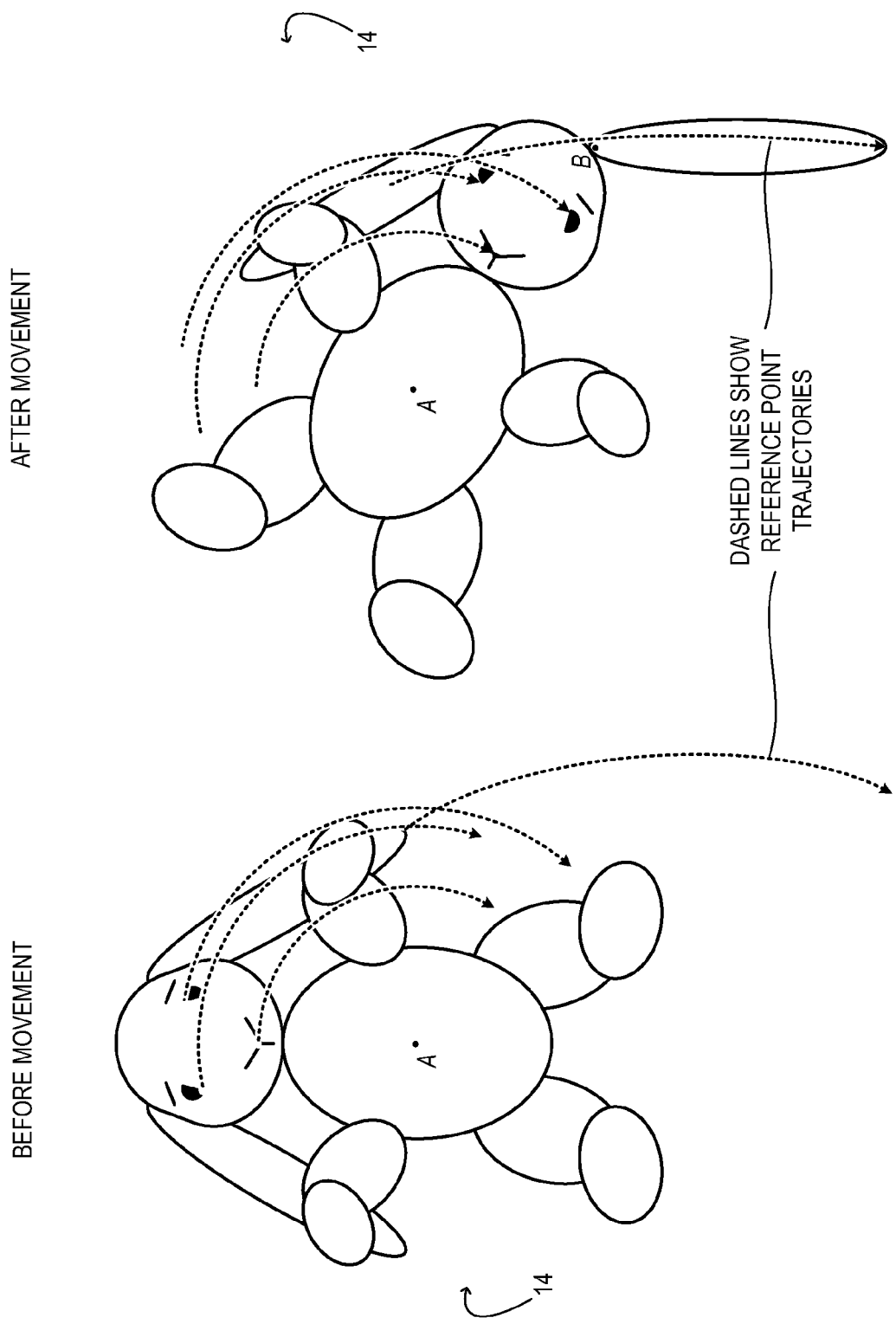
FIG. 4 shows an example object in motion, in accordance with an embodiment of this disclosure.

At 30 a set of reference points on the surface of the object is identified in an image from the acquired video. In one embodiment, the reference points may be identified based on brightness, color, and/or texture. Referring now to FIG. 4, the reference points may be bright spots or dark spots, for example, like the bunny's eyes and nose. In another embodiment, the reference points may be identified based on contour. For example, points where the surface of the object has the greatest curvature may be identified as reference points. Accordingly, points at the ends of the bunny's ears may be identified as reference points.

2D aspects of an acquired image may, in some scenarios, furnish enough information to allow at least some reference points to be identified. Brightness and color, for instance, are properties fully encoded in a 2D image. In other scenarios, at least some reference points may be identified in view of the surface-contour data provided by depth mapping.

Method 26 relies on the object's motion being captured in the acquired video. Such motion may include translational and/or rotational motion relative to the vision system and/or deformation. In some scenarios, the object may move on its own, such that the motion is natural or adventitious. In other scenarios, the object may be forcibly moved or prompted to move or be moved. When necessary, such action is undertaken at 32 of method 26. In one example, the object may be translated relative to the vision system—e.g., lifted up or down, pushed, or pulled over a surface. In another example, the object may be rotated about any axis. In other examples, the object may be bent, stretched, compressed, or otherwise manipulated. In some embodiments, the object may not be moved per se, but prompted to move. Such prompting may include instructing the object to move in a desired way or providing a stimulus that causes it to move in the desired way. In still other embodiments, such instruction may be given not to the object but to an agent responsible for moving the object.

At 34 a 3D displacement is observed for each of the reference points identified at 30, in response to the motion of the object. This action may involve tracking each of the identified reference points through a sequence of video frames—i.e., plotting out a 3D trajectory or path of the each of the reference points at fine intervals. A suitable tracking procedure may identify the 3D position of the reference points from frame to frame. In one embodiment, the trajectory may be represented by a mathematical formula such as a 3D vector defined in terms of a parameter (e.g., time or frame number). In one embodiment, trajectories of multiple points may be defined in terms of the same parameter.

FIG. 4 shows, in dashed lines, example displacements that may be observed when object 14 is rotated 120° about the axis marked A. This axis passes through the body, normal to the plane of the drawing. In the illustrated example, the reference points corresponding to the eyes and nose synchronously trace out concentric 120° arcs. The reference point corresponding to the end of the left ear, however, traces out a path that is not a 120° arc.

At 36 groups of reference points are formed in which a common translational or rotational motion of the object results in the observed displacement. In other words, groups of reference points that maintain the same relative positions to one another are identified as being reference points on the same shape. A plurality of groups may be formed from the identified reference points, wherein, for each group, a common translational or rotational motion of the object results in the displacements observed, and wherein the common translational or rotational motion differs for each group. In the example of FIG. 4, the points corresponding to the eyes and nose of the bunny would belong to the same group because a common rotational motion of object 14 results in the observed displacement of these points—viz., synchronous movement through concentric 120° arcs. In contrast, reference points corresponding to the ends of the bunny's ears will not belong to the same group as the eyes and nose. This is because rotation of the object results in torsion between the bunny's left ear and head, causing the reference point at the end of the left ear to follow a different trajectory.

In the example of FIG. 4, it is easy to see merely from the 2D drawing that the reference points corresponding to the eyes and nose of the bunny rotate together, as a group. This is because the rotation is normal to the plane of the drawing. It will be appreciated, however, that the image plane of the vision system need not be oriented in any special way with respect to the motion of the object. Unambiguous tracking of the reference-point displacements is simplified, therefore, when the reference points are located in not two, but three, dimensions. 3D tracking reduces the number of reference points needed to define a rigid group of reference points. Further, it reduces the range of motions needed to unambiguously associate a reference point with one group, particularly when the various groups may move with respect to each other, as further described below.

To determine whether or not a given reference point belongs to a given group, various procedures may be used. In one embodiment, algebraic methods may be used to solve for a 3D coordinate transform that accounts for the displacement of one or more reference points in a group. The coordinate transform may correspond to a translational and/or rotational motion. In one embodiment, the coordinate transform may be derived from a 3D parametric vector function defined for the reference point (vide supra).

Then, the same coordinate transform may be applied provisionally to various other reference points that may or may not belong to the group. Specifically, the coordinate transform may be used to predict a displacement of one or more candidate reference points. The predicted displacement may then be compared to the displacement observed in the video. Those reference points for which the observed displacement is within a predefined interval of a predicted displacement may then be assigned to the group.

The example of FIG. 4 is chosen for ease of illustration. It will be understood, however, that more complex motion of the object—e.g., combined translation and rotation—would result in more complex displacement of the identified reference points. Such displacement may be expressed as a coordinate transform and decomposed into simpler coordinate transforms corresponding to pure rotations and/or translations.

In some scenarios, rotation and/or translation of the object ray cause some of the reference points to disappear from the captured video. Such points may move out of range of the vision system, for example, or be rotated to the back side of the object. In this case, repeated execution of the above method steps will result in additional, replacement reference points being identified. Moreover, continued rotation (or translation in the opposite direction) may cause some reference points to reappear after they have disappeared. The actions here taken may therefore include determining whether a newly identified reference point corresponds to a previously identified reference point. In this manner, the trajectories of the various points within the group will remain consistent. Further, when the disappearance of a reference point is due to rotation causing a different side of the object to be sighted, the trajectory of that point may be extended, mathematically, to times or frames after the disappearance and/or before the reappearance, consistent with the reference point belonging to its assigned group.

At 38 those reference points whose observed displacement does not result from a common translational or rotational motion of any of the assigned groups are rejected. Individual reference points that fail to transform with any of the assigned groups may be points at which a specular reflection from the object appears in the video.

Figure 5:
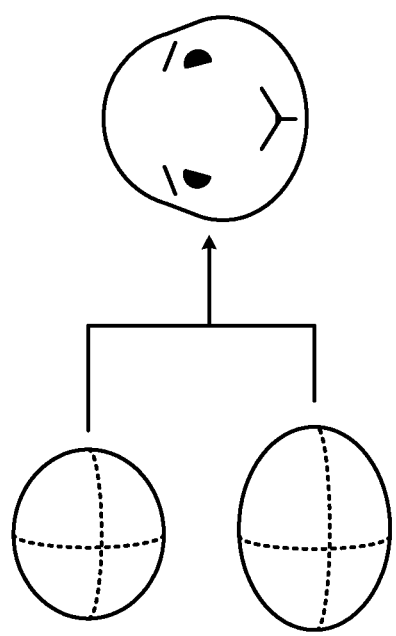
FIG. 5 shows an example construction of a complex shape from two simpler shapes, in accordance with an embodiment of this disclosure.

At 40 the groups of surface points assigned in this manner are fit to a series of 3D shapes, such shapes forming the basis of a virtual model of the object. In one embodiment, each shape is defined by fitting the reference points of its corresponding group. To this end, linear or non-linear least-squares fitting may be used. In one embodiment, at least one group of reference points may be fit to a simple 3D shape such as a polyhedron, cylinder, or ellipsoid. Further, at least one group may be fit to a more complex shape. The more complex shapes may be formed from two or more simpler shapes—two ellipsoids, three polyhedrons, etc. In this case, the simpler shapes are assumed to be rigidly interconnected, such that they move in concert when the object translates or rotates. In FIG. 4, for example, the bunny's arms, legs, body, and ears are each fit to a single ellipsoid of appropriate dimensions. However, the bunny's head may be fit to a more complex shape—e.g., two interpenetrating ellipsoids sharing one axis, as shown in FIG. 5.

More generally, the virtual models constructed at this stage of the method may be refined to any desired level: from a very primitive level where each group of points is fit to one, simple, 3D shape; to a more refined level where at least some of the groups may be fit to several, interconnected, simple shapes; to a very refined level where interconnected simple shapes are used in sufficient number to match the resolved contour of the sighted object. In other words, the tessellations of the object created at 40 may be crude approximations—e.g., an ellipsoid for the bunny's ear—or fully tessellated mesh that matches the contour of the object, or anything in between.

In some embodiments, the actions taken at 40 may include matching the plurality of shapes (defined, as above, based on grouped reference points) to a best-fitting prototype virtual model. Through suitable matching procedures, the best-fitting prototype virtual model may be selected from a library of prototype virtual models accessible to the vision system. In the present example, the library may include predefined characters used in a video game—a bunny, a duck, and a cat, for example. In one embodiment, the selection may be based purely on geometric similarity. In other embodiments, however, the selection may take into account the deformation properties of the prototype virtual model (vide infra). In still other embodiments, the selection may be responsive to one or more sounds coming from the object, as detected by the vision system. After the best-fitting prototype virtual model is selected, it may be refined—e.g., instantiated—based on coordinates extracted from of the plurality of shapes fit to the groups of reference points.

At 41 one or more corresponding surface attributes are assigned to each of the series of 3D shapes derived from the fitting. Such surface attributes may include brightness, color, and/or texture. In one embodiment, the surface attributes may be derived from one or more aspects of the 2D image data from the acquired video. Accordingly, a constituent shape in the virtual image of an object may be 'colorized' consistent with the color found in a video image of the object, in a locus specifically mapped to that shape. Naturally, the colors or other surface attributes assigned to a shape may vary from one locus to another on the surface of the shape, and may be corrected for shadows and various lighting anomalies of the sighted object.

At 42 a relative displacement in coordinates of two or more of the groups is observed in response to a motion of the object. Such relative displacement may include the torsion between the bunny's head and left ear during the 120° rotation in the example previously discussed. Relative displacement of this kind is evidence of localized non-rigidity in the object. It may indicate a potential point of breakage of the object, for instance, or it may enable identification of one or more potential deformation modes of the object.

Figure 6:
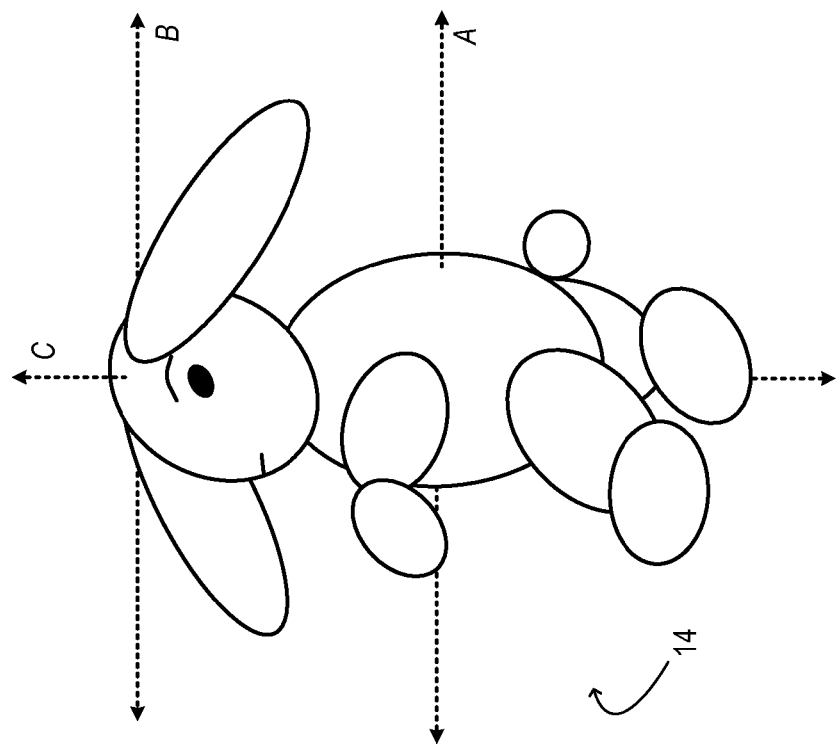
FIG. 6 shows an example object in motion, in accordance with an embodiment of this disclosure.

Accordingly, at 44, a deformation mode of the object is determined based on the relative displacements observed. In one embodiment, the deformation mode may be a rotational mode. For example, the torsional displacement illustrated in FIG. 4 indicates that the ear is at least somewhat free to rotate about the axis marked B. Naturally, the number and nature of the deformation modes determined at 44 may depend on the variety of motion of the object captured in the video. For instance, if the bunny were rotated rapidly about the central axis of the body, other rotational modes could be determined—e.g., that the ears are free to rotate about axes parallel to the central axis of the body, as shown in FIG. 6.

In another embodiment, the deformation mode determined at 44 may be a stretching mode. Suppose, for example, that the bunny were held by the ends of the ears and suspended therefrom: the bunny's weight may cause it to elongate, specifically at the intersections of the various rigid shapes that define the virtual model. Accordingly, both kinds of deformation modes—rotational and stretching—may be defined with reference to an intersection of the two or more shapes corresponding to the two or more groups. Determined in this manner, the deformation modes of the object may be used in various ways, depending on the application. For example, in a video-game embodiment, the deformation modes may furnish information that determines how the object, once virtualized, may be animated. One method, therefore, may include rendering an animated representation of the object based on the virtual model; the representation may be animated via a motion consistent with the one or more deformation modes determined above. Referring again to the illustrated example, once it has been determined that the bunny's ear can rotate about the axis marked B, a virtual representation of the bunny may be constructed in which the bunny can raise and lower the ear via the rotation. Such a representation may be used, for instance, as an animated character in a vide game. From 44, method 26 returns.

As noted above, the methods and functions described herein may be enacted via controller 22, shown schematically in FIG. 3. The controller includes logic subsystem 46 and memory subsystem 48. Through operative coupling of the logic subsystem and the memory subsystem, the controller may be configured to enact any method—i.e., computation, processing, or control function—described herein.

More specifically, memory subsystem 48 may hold instructions that cause logic subsystem 46 to enact the various methods. To this end, the logic subsystem may include one or more physical devices configured to execute instructions. For example, the logic subsystem may be configured to execute instructions that are part of one or more programs, routines, objects, components, data structures, or other logical constructs. Such instructions may be implemented to perform a task, implement a data type, transform the state of one or more devices, or otherwise arrive at a desired result. The logic subsystem may include one or more processors configured to execute software instructions. Additionally or alternatively, the logic subsystem may include one or more hardware or firmware logic machines configured to execute hardware or firmware instructions. The logic subsystem may optionally include components distributed among two or more devices, which may be remotely located in some embodiments.

Memory subsystem 48 may include one or more physical, non-transitory, devices configured to hold data and/or instructions executable by logic subsystem 46 to implement the methods and functions described herein. When such methods and functions are implemented, the state of the memory subsystem may be transformed (e.g., to hold different data). The memory subsystem may include removable media and/or built-in devices. The memory subsystem may include optical memory devices, semiconductor memory devices, and/or magnetic memory devices, among others. The memory subsystem may include devices with one or more of the following characteristics: volatile, nonvolatile, dynamic, static, read/write, read-only, random access, sequential access, location addressable, file addressable, and content addressable. In one embodiment, the logic subsystem and the memory subsystem may be integrated into one or more common devices, such as an application-specific integrated circuit (ASIC) or so-called system-on-a-chip. In another embodiment, the memory subsystem may include computer-system readable removable media, which may be used to store and/or transfer data and/or instructions executable to implement the herein-described methods and processes. Examples of such removable media include CD's, DVD's, HD-DVD's, Blu-Ray Discs, EEPROMs, and/or floppy disks, among others.

In contrast, in some embodiments aspects of the instructions described herein may be propagated in a transitory fashion by a pure signal—e.g., an electromagnetic signal, an optical signal, etc.—that is not held by a physical device for at least a finite duration. Furthermore, data and/or other forms of information pertaining to the present disclosure may be propagated by a pure signal.

The terms 'module' and/or 'engine' are used to describe an aspect of controller 22 that is implemented to perform one or more particular functions. In some cases, such a module or engine may be instantiated via logic subsystem 46 executing instructions held by memory subsystem 48. It will be understood that different modules and/or engines may be instantiated from the same application, code block, object, routine, and/or function. Likewise, the same module and/or engine may be instantiated by different applications, code blocks, objects, routines, and/or functions in some cases.

As shown in FIG. 3, controller 22 may include various input devices and various output devices, such as display 12. Display 12 may provide a visual representation of data held by memory subsystem 48. As the herein-described methods and processes change the data held by the memory subsystem, and thus transform the state of the memory subsystem, the state of the display may likewise be transformed to visually represent changes in the underlying data. The display may include one or more display devices utilizing virtually any type of technology. Such display devices may be combined with logic subsystem 46 and/or memory subsystem 48 in a shared enclosure, or such display devices may be peripheral display devices.

Finally, it will be understood that the articles, systems, and methods described hereinabove are embodiments of this disclosure—non-limiting examples for which numerous variations and extensions are contemplated as well. Accordingly, this disclosure includes all novel and non-obvious combinations and sub-combinations of the articles, systems, and methods disclosed herein, as well as any and all equivalents thereof.

The invention claimed is:

1. A method for constructing a virtual model of an arbitrary, physical object based on video of the object acquired while the physical object is undergoing a deformation, the method comprising:

identifying in the video a set of reference points corresponding to different positions on the physical object;

for each reference point identified, observing a displacement of that reference point in response to the deformation of the physical object;

grouping together a first group of reference points for which a shared first coordinate transform results in the observed displacement;

grouping together a second group of reference points for which a shared second coordinate transform results in the observed displacement, the first and second coordinate transforms differing from each other;

fitting the first group of reference points to a first 3D shape;

fitting the second group of reference points to a second 3D shape; and combining at least the first and second 3D shapes to form the virtual model, the formed virtual model being of a prototype geometry not determined prior to the fitting of the first and second groups of reference points.

2. The method of claim 1, wherein the first shape comprises an ellipsoid.

3. The method of claim 1, wherein the first shape is one of a plurality of shapes to which the first group of reference points are fit.

4. The method of claim 1, wherein the video comprises a rectangular array of pixels and encodes one or more of a brightness, a color, and a polarization state for each pixel.

5. The method of claim 4, wherein the video further encodes a depth coordinate for each pixel.

6. The method of claim 1, wherein grouping together the first group of reference points comprises grouping those reference points for which the observed displacement is within an interval of a predicted displacement, and wherein the predicted displacement is predicted based on the first coordinate transform.

7. The method of claim 1, wherein the first and second groups are among a plurality of groups of the identified reference points, wherein, for each group, a given coordinate transform results in the displacements observed, and wherein the given coordinate transform differs for each group.

8. The method of claim 7 further comprising rejecting a reference point whose observed displacement is not consistent with the coordinate transform associated with any of the groups.

9. The method of claim 7, wherein the virtual model comprises a plurality of 3D shapes corresponding to the plurality of groups, and wherein each 3D shape is defined by fitting the reference points of its corresponding group, the method further comprising:

matching the plurality of 3D shapes to a prototype virtual model from a library of prototype virtual models; and refining the prototype virtual model based on coordinates of the plurality of 3D shapes.

10. The method of claim 7, wherein the virtual model comprises a plurality of 3D shapes corresponding to the plurality of groups, and wherein each 3D shape is defined by fitting the reference points of its corresponding group, the method further comprising:

observing a change in coordinates of the first group relative to the second group in response to the deformation of the physical object; and determining a deformation mode of the physical object based on the change in coordinates.

11. The method of claim 10, wherein the deformation mode is one or more of a rotational mode and a stretching mode.

12. The method of claim 10, wherein the deformation mode is defined with reference to an intersection of two or more 3D shapes corresponding to the two or more groups.

13. The method of claim 10 further comprising rendering an animated representation of the physical object based on the virtual model, wherein the representation is animated via motion consistent with the deformation mode.

14. The method of claim 13 further comprising causing the physical object to translate or rotate.

15. The method of claim 13 further comprising causing the physical object to deform.

16. The method of claim 1 wherein the deformation is caused by motion of the physical object.

17. A method for constructing a virtual model of an arbitrary, physical object based on video of the object acquired while the physical object is undergoing a deformation, the method comprising:

acquiring video that includes an image of the physical object in motion;

identifying in the image a set of reference points corresponding to different positions on the physical object;

for each reference point identified, observing a displacement of that reference point in response to the deformation of the physical object, which is caused by the motion;

grouping together a first group of reference points for which a shared first coordinate transform results in the observed displacement;

grouping together a second group of reference points for which a shared second coordinate transform results in the observed displacement, the first and second coordinate transforms differing from each other;

fitting the first group of reference points to a first 3D shape;

fitting the second group of reference points to a second 3D shape; and combining at least the first and second 3D shapes to form the virtual model, the formed virtual model being of a prototype geometry not determined prior to the fitting of the first and second groups of reference points.

18. The method of claim 17 further comprising assigning a surface attribute to the first shape based on an aspect of the image.

19. A system comprising:

a video camera; and a memory subsystem operatively coupled to a logic subsystem and including instructions that, in response to execution, cause the logic subsystem to:

acquire video that includes an image of an arbitrary, physical object undergoing motion that causes a deformation of the object;

identify in the image a set of reference points corresponding to different positions on the physical object;

for each reference point identified, observe a displacement of that reference point in response to the deformation of the physical object caused by the motion;

group together a first group of reference points for which a shared first coordinate transform results in the observed displacement;

group together a second group of reference points for which a shared second coordinate transform results in the observed displacement, the first and second coordinate transforms differing from each other;

fit the first group of reference points to a first 3D shape;

fit the second group of reference points to a second 3D shape;

observe a change in coordinates of the first group of reference points relative to the second group of reference points in response to the motion of the physical object; and combine at least the first and second 3D shapes to form the virtual model, the formed virtual model being of a prototype geometry not determined prior to the fitting of the first and second groups of reference points and exhibiting a rotational or stretching mode based on the observed change in coordinates.

20. The system of claim 19, wherein the memory subsystem also includes instructions to execute a video-game application.

* * * * *